United States Patent
Yang et al.

(10) Patent No.: US 11,115,954 B2
(45) Date of Patent: Sep. 7, 2021

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Ning Yang, Dongguan (CN); Jianhua Liu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/608,777

(22) PCT Filed: Apr. 28, 2017

(86) PCT No.: PCT/CN2017/082401
§ 371 (c)(1),
(2) Date: Oct. 25, 2019

(87) PCT Pub. No.: WO2018/195907
PCT Pub. Date: Nov. 1, 2018

(65) Prior Publication Data
US 2020/0205120 A1     Jun. 25, 2020

(51) Int. Cl.
*H04W 4/70* (2018.01)
*H04W 88/04* (2009.01)
(Continued)

(52) U.S. Cl.
CPC ......... *H04W 68/005* (2013.01); *H04W 88/04* (2013.01)

(58) Field of Classification Search
CPC . H04W 52/0229; H04W 24/02; H04W 48/16; H04W 8/005; H04W 74/002;
(Continued)

(56) References Cited

U.S. PATENT DOCUMENTS

| 8,934,404 B2* | 1/2015 | Soliman ............. H04W 88/04 370/328 |
| 9,049,538 B2* | 6/2015 | Lee ..................... H04W 4/70 |

(Continued)

FOREIGN PATENT DOCUMENTS

| CN | 101577886 A | 11/2009 |
| CN | 102811497 A | 12/2012 |
| WO | WO2018201499 A1 * | 11/2018 |

OTHER PUBLICATIONS

A Remote Monitoring System Based on Web and SNMP by Bai Xiaojun Published in: 2012 International Conference on Industrial Control and Electronics Engineering Oct. 2012 (Year: 2012).*
(Continued)

*Primary Examiner* — William D Cumming

(57) ABSTRACT

A wireless communication method includes that: a network device sends an instruction message to a first terminal device, the instruction message being used for instructing the first terminal device to listen for a paging message of a second terminal device at a paging time point of the first terminal device or instructing the first terminal device to listen for a paging message of the second terminal device at a paging time point of the second terminal device, the second terminal device communicating with the network device through the first terminal device.

14 Claims, 5 Drawing Sheets

(51) Int. Cl.
  *H04W 68/02* (2009.01)
  *H04W 48/16* (2009.01)
  *H04W 68/00* (2009.01)
(58) Field of Classification Search
  CPC ....... H04W 68/005; H04W 4/70; H04W 8/08;
     H04W 76/16; H04W 36/0088; H04W
     88/04; H04W 52/0216; H04W 36/088;
     H04W 68/02; H04W 8/0088
  USPC ......... 455/458, 515, 328; 370/311, 329, 328
  See application file for complete search history.

(56) References Cited

U.S. PATENT DOCUMENTS

| | | | | |
|---|---|---|---|---|
| 9,609,671 | B2* | 3/2017 | Zhang | H04W 4/70 |
| 9,763,221 | B2* | 9/2017 | Patil | H04W 52/0216 |
| 9,763,223 | B2* | 9/2017 | Patil | H04W 4/80 |
| 9,769,645 | B2* | 9/2017 | Patil | H04W 8/005 |
| 9,775,022 | B1* | 9/2017 | Sahu | H04W 76/16 |
| 9,788,273 | B2* | 10/2017 | Pocha | H04W 4/70 |
| 9,888,453 | B2* | 2/2018 | Arkko | H04W 52/0225 |
| 9,961,668 | B2* | 5/2018 | Patil | H04W 52/0216 |
| 10,085,211 | B2* | 9/2018 | Prats | H04W 52/0229 |
| 10,117,222 | B2* | 10/2018 | Patil | H04W 52/0216 |
| 10,327,224 | B2* | 6/2019 | Walldeen | H04W 4/70 |
| 10,701,667 | B2* | 6/2020 | Abedini | H04W 68/005 |
| 2009/0219844 | A1* | 9/2009 | Soliman | H04W 88/04 370/311 |
| 2013/0265952 | A1* | 10/2013 | Lee | H04W 4/70 370/329 |
| 2015/0139153 | A1* | 5/2015 | Zhang | H04W 4/70 370/329 |
| 2015/0163827 | A1 | 6/2015 | Ekici | |
| 2015/0223199 | A1* | 8/2015 | Arkko | H04W 68/02 455/458 |
| 2016/0066273 | A1* | 3/2016 | Prats | H04W 24/02 370/311 |
| 2016/0112984 | A1* | 4/2016 | Patil | H04W 52/0216 455/458 |
| 2016/0112986 | A1* | 4/2016 | Patil | H04W 68/02 455/515 |
| 2016/0112987 | A1* | 4/2016 | Patil | H04W 8/005 455/515 |
| 2016/0119894 | A1* | 4/2016 | Patil | H04W 8/005 455/515 |
| 2016/0269994 | A1* | 9/2016 | Pocha | H04W 4/70 |
| 2017/0034723 | A1* | 2/2017 | Anand | H04W 36/0088 |
| 2017/0135067 | A1* | 5/2017 | Su | H04W 68/005 |
| 2017/0164327 | A1* | 6/2017 | Patil | H04W 68/02 |
| 2017/0265058 | A1* | 9/2017 | Sahu | H04W 76/16 |
| 2017/0374645 | A1* | 12/2017 | Tirronen | H04W 68/005 |
| 2018/0088976 | A1* | 3/2018 | Leslie-Hurd | G06F 21/62 |
| 2019/0243876 | A1* | 8/2019 | Castino | H04L 63/0428 |
| 2019/0313369 | A1* | 10/2019 | Abedini | H04W 68/005 |
| 2019/0364492 | A1* | 11/2019 | Azizi | H04W 92/045 |
| 2020/0205062 | A1* | 6/2020 | Azizi | H04W 68/005 |
| 2020/0205120 | A1* | 6/2020 | Yang | H04W 68/005 |

OTHER PUBLICATIONS

International Search Report in the international application No. PCT/CN2017/082401, dated Dec. 11, 2017.

Written Opinion of the International Search Authority in the international application No. PCT/CN2017/082401, dated Dec. 11, 2017.
Nokia et al: "Paging and Idle Mode procedures of remote UE", 3GPP Draft; R2-1701084_D2D_IDLE_MODE_VI.0, 3rd Generation Partnership Project (3GPP), vol. RAN WG2, No. Athens, Greece; Feb. 13, 2017-Feb. 17, 2017 Feb. 3, 2017 (Feb. 3, 2017), XP051222817, Retrieved from the Internet: URL: http://www.3gpp.org/ftp/tsg_ran/WG2_RL2/TSGR2_97/Docs/ [retrieved on Feb. 3, 2017] * paragraphs [0001]-[0003]*.
Intel Corporation: "Paging for remote UE", 3GPP Draft; R2-1701303_PAGING_FED2D_INTEL, 3rd Generation Partnership Project (3GPP), vol. RAN WG2, No. Athens, Greece; Feb. 13, 2017-Feb. 17, 2017 Feb. 12, 2017 ( Feb. 12, 2017) , XP051211968, Retrieved from the Internet: URL: http://www.3gpp.org/ftp/Meetings_3GPP_SYNC/RAN2/Docs/ [retrieved on Feb. 12, 2017] * paragraph [02.2] *.
ZTE: "Discussion on the paging of evolved remote UE", 3GPP Draft; R2-1703034 Discussion on the Paging of Evolved Remote UE, 3rd Generation Partnership Project (3GPP), vol. RAN WG2, No. Spokane, USA ; Apr. 3, 2017-Apr. 7, 2017 Apr. 3, 2017 (Apr. 3, 2017), XP051244989, Retrieved from the Internet: URL: http://www.3gpp.org/ftp/Meetings_3GPP_SYNC/RAN2/Docs [retrieved on Apr. 3, 2017] * the whole document *.
Intel Corporation: "Text proposal on paging enhancements", 3GPP Draft; R2-1702988, 3rd Generation Partnership Project (3GPP) , vol. RAN WG2, No. Spokane, USA; Apr. 3, 2017-Apr. 7, 2017 Apr. 3, 2017 (Apr. 3, 2017), XP051244949, Retrieved from the Internet: URL: http://www.3gpp.org/ftp/Meetings_3GPP_SYNC/RAN2/Docs/ [retrieved on Apr. 3, 2017] * paragraph [5.1.2.2] *.
ZTE: "Discussion on the pairing, paging and system info acquisition of remote UE", 3GPP Draft; R2-168170 Discussion on the Pairing, Paging and System Acquisition of Evolved Remote UE, 3rd Generation Partnership Project (3GPP) , Nov. 14, 2016-Nov. 18, 2016 Nov. 13, 2016 (Nov. 13, 2016) , XP051177844, Retrieved from the Internet: URL: http://www.3gpp.org/ftp/Meetings_3GPP_SYNC/RAN2/Docs/ [retrieved on Nov. 13, 2016] * the whole document *.
Supplementary European Search Report in the European application No. 17906898.6, dated Mar. 10, 2020.
First Office Action of the Korean application No. 10-2019-7034860, dated Jan. 28, 2021.
Huawei, HiSilicon "Paging and access" 3GPP TSG RAN WG2 Meeting #97 R2-1701136 Athens, Greece, Feb. 13-17, 2017.
First Office Action of the Indian application No. 201917048133, dated Feb. 24, 2021.
Intel Corporation, "Report of email discussion [97#66][LTE/FeD2D]—Paging" 3GPP TSG RAN WG2#97bis R2-1702987 Spokane, USA, Apr. 3-7, 2017.
Sony, "Paging via Relay" 3GPP TSG RAN WG2 Meeting #97bis R2-1703272 Spokane, USA, Apr. 3-7, 2017.
Nokia, Alcate-Lucent Shanghai Bell, "Paging discussion continued"3GPP TSG-RAN WG2 Meeting #97bis R2-1703364 Spokane, USA. Apr. 3-7, 2017.
Huawei, HiSilicon. "Further discussion on the paging receiving via Relay UE" 3GPP TSG-RAN WG2 Meeting #97bis R2-1703470 Spokane, USA, Apr. 3-7, 2017.
Qualcomm Incorporated, "Paging for enhanced Remote UE" 3GPP TSG RAN WG2 Meeting #97bis R2-1703521 Spokane, USA Apr. 3-7, 2017.
First Office Action of the European application No. 17906898.6, dated Nov. 20, 2020.
First Office Action of the Japanese application No. 2019-557611, dated Apr. 27, 2021.
Second Office Action of the Korean application No. 10-2019-7034860, dated Jul. 15, 2021.

* cited by examiner

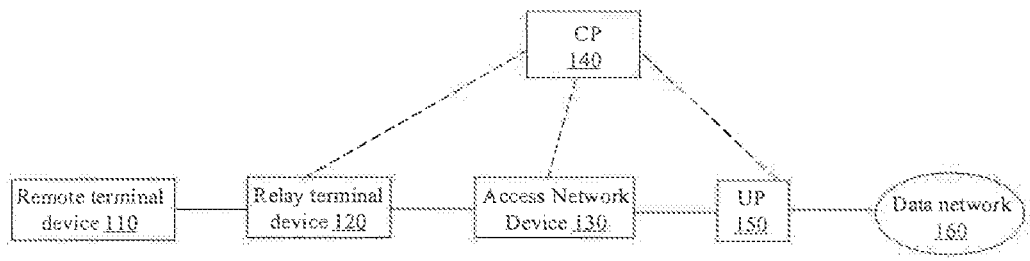

| A network device sends an instruction message to a first terminal device, wherein the instruction message is used for instructing the first terminal device to monitor a paging message of a second terminal device at a paging occasion of the first terminal device, or instructing the first terminal device to monitor a paging message of the second terminal device at a paging occasion of the second terminal device, the second terminal device communicating with the network device through the first terminal device | 210 |

| A network device receives a state update message from a first terminal device, wherein the state update message is used for requesting the network device to update link state information of a link between the first terminal device and a second terminal device, the second terminal device communicating with the network device through the first terminal device | 310 |

A first terminal device receives an instruction message from a network device, wherein the instruction message is used for instructing the first terminal device to monitor a paging message of a second terminal device at a paging occasion of the second terminal device, or instructing the first terminal device to monitor a paging message of the second terminal device at a paging occasion of the first terminal device, the second terminal device communicating with the network device through the first terminal device ⎯ 410

The first terminal device monitors the paging message of the second terminal device according to the instruction message ⎯ 420

A first terminal device sends a state update message to a network device, wherein the state update message is used for updating link state information of a link between the first terminal device and a second terminal device, the second terminal device communicating with the network device through the first terminal device ⎯ 510

FIG. 5

WIRELESS COMMUNICATION METHOD, NETWORK DEVICE, AND TERMINAL DEVICE

TECHNICAL FIELD

The present disclosure relates to the field of communications, and more particularly to, a wireless communication method, a network device and a terminal device.

BACKGROUND

With the development of wireless communication technologies, in a wireless communication system, a relay function for a wearable device is being introduced, mainly referring to a function of transmitting, by a remote terminal (for example, a wearable device), data through a relay terminal (for example, a mobile phone terminal). In this function, the relay terminal assists the remote terminal complete data transmission.

Because the remote terminal communicates with a network device (for example, a base station or a core network device) through the relay terminal, the network device cannot directly communicate with the remote terminal. When there is downlink data of the remote terminal, how to send a paging message to the remote terminal device by the network device so as to ensure the correct transmission of the downlink data of the remote terminal is a technical problem urgently to be solved.

SUMMARY

The embodiments of the present disclosure provide a wireless communication method, a network device and a terminal device. The network device can send a paging message to a remote terminal in at least two manners, and a relay terminal receives the paging message of the remote terminal in one of the at least two manners. Thus, the correct transmission of downlink data of the terminal device is ensured.

According to a first aspect, the embodiments of the present disclosure provide a wireless communication method, which may include the following operation.

A network device sends an instruction message to a first terminal device, the instruction message being used for instructing the first terminal device to monitor a paging message of a second terminal device at a paging occasion of the first terminal device, or instructing the first terminal device to monitor a paging message of the second terminal device at a paging occasion of the second terminal device, the second terminal device communicating with the network device through the first terminal device.

In the wireless communication method of the embodiments of the present disclosure, by means of the instruction message, a network device instructs a first terminal device to monitor a paging message of a second terminal device at a paging occasion of the first terminal device or instructs the first terminal device to monitor the paging message of the second terminal device at a paging occasion of the second terminal device, so that the paging message of the second terminal device may be sent correctly by the network device through the first terminal device, and thus correct transmission of downlink data of the second terminal device is ensured.

In a possible implementation manner of the first aspect, before the network device sends the instruction message to the first terminal device, the method may further include the following action.

The network device determines that a paging message of the second terminal device is sent at a paging occasion of the first terminal device.

The operation that a network device sends an instruction message to a first terminal device may include the following action.

The network device sends to the first terminal device the instruction message for instructing the first terminal device to monitor the paging message of the second terminal device at the paging occasion of the first terminal device.

In the wireless communication method of the embodiments of the present disclosure, a network device determines that a paging message of a second terminal device is sent at a paging occasion of a first terminal device. At this time, an instruction message is used for instructing the first terminal device to monitor the paging message of the second terminal device at the paging occasion of the first terminal device, so that the first terminal device may correctly receive the paging message of the second terminal device, and thus correct transmission of downlink data of the second terminal device is ensured.

In a possible implementation manner of the first aspect, before the network device sends the instruction message to the first terminal device, the method may further include the following action.

The network device determines that a paging message of the second terminal device is sent at a paging occasion of the second terminal device.

The operation that a network device sends an instruction message to a first terminal device may include the following action.

The network device sends to the first terminal device the instruction message for instructing the first terminal device to monitor the paging message of the second terminal device at the paging occasion of the second terminal device.

In the wireless communication method of the embodiments of the present disclosure, a network device determines that a paging message of a second terminal device is sent at a paging occasion of the second terminal device. At this time, an instruction message is used for instructing a first terminal device to monitor the paging message of the second terminal device at the paging occasion of the second terminal device, so that the paging message of the second terminal device may be received correctly by the first terminal device, and thus the correct transmission of downlink data of the second terminal device is ensured.

In a possible implementation manner of the first aspect, the paging message of the second terminal device may be carried in a paging message of the first terminal device.

In a possible implementation manner of the first aspect, the instruction message may be a system message or a Radio Resource Control (RRC) dedicated signaling.

According to a second aspect, the embodiments of the present disclosure provide a wireless communication method, which may include the following action.

A network device receives a state update message from a first terminal device, the state update message being used for requesting the network device to update link state information of a link between the first terminal device and a second terminal device, the second terminal device communicating with the network device through the first terminal device.

In the wireless communication method of the embodiments of the present disclosure, a network device may update link state information of a link between a first terminal device and a second terminal device by means of a state update message received from the first terminal device, so that when the first terminal device needs to establish a link connection with the second terminal device, the network device may update the link state information of the link between the first terminal device and the second terminal device in time.

In a possible implementation manner of the second aspect, the method may further include the following actions.

The network device sends a response message for the state update message to the first terminal device.

The network device sends a paging message of the second terminal device at a paging occasion of the first terminal device according to the response message, or sends a paging message of the second terminal device at a paging occasion of the second terminal device.

In the wireless communication method of the embodiments of the present disclosure, a network device may determine, according to a response message, an occasion at which a paging message of a second terminal device is sent.

In a possible implementation manner of the second aspect, the operation that the network device sends a response message for the state update message to the first terminal device may include the following actions.

The network device sends to the first terminal device a response message indicating successful update of the link state information of the link between the first terminal device and the second terminal device; or the network device sends to the first terminal device a response message indicating update failure of the link state information of the link between the first terminal device and the second terminal device; or the network device sends to the first terminal device a response message indicating update rejection of the link state information of the link between the first terminal device and the second terminal device.

In a possible implementation manner of the second aspect, the operation that the network device sends, according to the response message, a paging message of the second terminal device at a paging occasion of the first terminal device or sends a paging message of the second terminal device at a paging occasion of the second terminal device may include the following actions.

The network device sends a paging message of the second terminal device at a paging occasion of the second terminal device in condition that the response message includes the response message indicating update failure of the link state information of the link between the first terminal device and the second terminal device; or the network device sends a paging message of the second terminal device at a paging occasion of the second terminal device in condition that the response message includes the response message indicating update rejection of the link state information of the link between the first terminal device and the second terminal device; or the network device sends a paging message of the second terminal device at a paging occasion of the first terminal device in condition that the response message includes the response message indicating successful update of the link state information of the link between the first terminal device and the second terminal device.

In the wireless communication method of the embodiments of the present disclosure, in condition that the response message sent by a network device includes a response message indicating that update of link state information fails or update of the link state information is rejected, the network device sends a paging message of a second terminal device at a paging occasion of the second terminal device, and in condition that the response message sent by the network device includes a response message indicating that update of the link state information is successful, the network device sends the paging message of the second terminal device at a paging occasion of a first terminal device, so that correct transmission of downlink data of the second terminal device is ensured.

In a possible implementation manner of the second aspect, the response message indicating update failure of the link state information of the link between the first terminal device and the second terminal device may be an RRC connection release message, the RRC connection release message including a connection failure indication message.

The response message indicating update rejection of the link state information of the link between the first terminal device and the second terminal device may be an RRC connection rejection message.

The response message indicating successful update of the link state information of the link between the first terminal device and the second terminal device may be an RRC connection configuration message.

According to a third aspect, the embodiments of the present disclosure provide a wireless communication method, which may include the following actions.

A first terminal device receives an instruction message from a network device, the instruction message being used for instructing the first terminal device to monitor a paging message of a second terminal device at a paging occasion of the second terminal device, or instructing the first terminal device to monitor a paging message of the second terminal device at a paging occasion of the first terminal device, the second terminal device communicating with the network device through the first terminal device.

The first terminal device monitors the paging message of the second terminal device according to the instruction message.

According to the wireless communication method of the embodiments of the present disclosure, a first terminal device monitors a paging message of a second terminal device according to an instruction message received from a network device, so that correct transmission of downlink data of the second terminal device is ensured.

In a possible implementation manner of the third aspect, the method may further include the following action.

The first terminal device sends the paging message of the second terminal device to the second terminal device after the paging message of the second terminal device is monitored.

In a possible implementation manner of the third aspect, the paging message of the second terminal device may be carried in a paging message of the first terminal device.

In a possible implementation manner of the third aspect, the instruction message may be a system message or an RRC dedicated signaling.

According to a fourth aspect, the embodiments of the present disclosure provide a wireless communication method, which may include the following action.

A first terminal device sends a state update message to a network device, the state update message being used for updating link state information of a link between the first terminal device and a second terminal device, the second terminal device communicating with the network device through the first terminal device.

In the wireless communication method of the embodiments of the present disclosure, a first terminal device sends a state update message to a network device, such that the network device updates link state information of the link between the first terminal device and a second terminal device.

In a possible implementation manner of the fourth aspect, the method may further include the following actions.

The first terminal device receives a response message for the state update message from the network device.

The first terminal device monitors according to the response message, a paging message of the second terminal device at a paging occasion of the second terminal device, or monitors a paging message of the second terminal device at a paging occasion of the first terminal device.

In the wireless communication method of the embodiments of the present disclosure, according to the response message for the link state update message, a first terminal device may determine that a paging message of a second terminal device is monitored at a paging occasion of the second terminal device or that the paging message of the second terminal device is monitored at a paging occasion of the first terminal device, so that the paging message of the second terminal device may be received correctly by the first terminal device, and thus correct transmission of downlink data of the second terminal device is ensured.

In a possible implementation manner of the fourth aspect, the operation that the first terminal device monitors according to the response message a paging message of the second terminal device at a paging occasion of the second terminal device, or monitors a paging message of the second terminal device at a paging occasion of the first terminal device may include the following actions.

The first terminal device monitors a paging message of the second terminal device at a paging occasion of the second terminal device in condition that the response message includes an RRC connection release message and the RRC connection release message includes a connection failure indication message; or the first terminal device monitors a paging message of the second terminal device at a paging occasion of the second terminal device in condition that the response message includes an RRC connection rejection message; or, the first terminal device monitors a paging message of the second terminal device at a paging occasion of the first terminal device in condition that the response message includes an RRC connection configuration message.

In a possible implementation manner of the fourth aspect, in condition that the response message includes the RRC connection release message or the RRC connection rejection message, the method may further include the following action.

The first terminal device determines that the state update message is not required to be resent to the network device in condition that a link between the first terminal device and the second terminal device is disconnected.

In a possible implementation manner of the fourth aspect, the method may further include the following action.

The first terminal device sends the paging message of the second terminal device to the second terminal device after the paging message of the second terminal device is monitored.

According to a fifth aspect, the embodiments of the present disclosure provide a network device, capable of executing a module or unit for the method in the first aspect or any implementation manner of the first aspect.

According to a sixth aspect, the embodiments of the present disclosure provide a network device, capable of executing a module or unit for the method in the second aspect or any implementation manner of the second aspect.

According to a seventh aspect, the embodiments of the present disclosure provide a terminal device, capable of executing a module or unit for the method in the third aspect or any implementation manner of the third aspect.

According to an eighth aspect, the embodiments of the present disclosure provide a terminal device, capable of executing a module or unit for the method in the fourth aspect or any implementation manner of the fourth aspect.

According to a ninth aspect, a network device is provided. The network device may include a processor, a memory and a communication interface. The processor may be connected to the memory and the communication interface. The memory may be configured to store an instruction, the processor may be configured to execute the instruction, and the communication interface may be configured to communicate with other network elements under the control of the processor. When the processor executes the instruction stored in the memory, the processor may be enabled to perform the method in the first aspect or any implementation manner of the first aspect.

According to a tenth aspect, a network device is provided. The network device may include a processor, a memory and a communication interface. The processor may be connected to the memory and the communication interface. The memory may be configured to store an instruction, the processor may be configured to execute the instruction, and the communication interface may be configured to communicate with other network elements under the control of the processor. When the processor executes the instruction stored in the memory, the processor may be enabled to perform the method in the second aspect or any implementation manner of the second aspect.

According to an eleventh aspect, a terminal device is provided. The terminal device may include a processor, a memory and a communication interface. The processor may be connected to the memory and the communication interface. The memory may be configured to store an instruction, the processor may be configured to execute the instruction, and the communication interface may be configured to communicate with other network elements under the control of the processor. When the processor executes the instruction stored in the memory, the processor may be enabled to perform the method in the third aspect or any implementation manner of the third aspect.

According to a twelfth aspect, a terminal device is provided. The terminal device may include a processor, a memory and a communication interface. The processor may be connected to the memory and the communication interface. The memory may be configured to store an instruction, the processor may be configured to execute the instruction, and the communication interface may be configured to communicate with other network elements under the control of the processor. When the processor executes the instruction stored in the memory, the processor may be enabled to perform the method in the fourth aspect or any implementation manner of the fourth aspect.

According to a thirteenth aspect, a computer storage medium is provided. The computer storage medium may store a program code, the program code being used for instructing a computer to execute an instruction of the method in the first aspect or any implementation manner of the first aspect.

According to a fourteenth aspect, a computer storage medium is provided. The computer storage medium may store a program code, the program code being used for instructing a computer to execute an instruction of the method in the second aspect or any implementation manner of the second aspect.

According to a fifteenth aspect, a computer storage medium is provided. The computer storage medium may store a program code, the program code being used for instructing a computer to execute an instruction of the method in the third aspect or any implementation manner of the third aspect.

According to a sixteenth aspect, a computer storage medium is provided. The computer storage medium may store a program code, the program code being used for instructing a computer to execute an instruction of the method in the fourth aspect or any implementation manner of the fourth aspect.

According to a seventeenth aspect, a computer program product including an instruction is provided, which may enable, when being run on a computer, the computer to perform the methods in all of the above aspects.

BRIEF DESCRIPTION OF DRAWINGS

FIG. 1 illustrates a schematic diagram of a communication system using a wireless communication method of the present disclosure.

FIG. 2 is a schematic flowchart of a wireless communication method according to an embodiment of the present disclosure.

FIG. 3 is a schematic flowchart of a wireless communication method according to another embodiment of the present disclosure.

FIG. 4 is a schematic flowchart of a wireless communication method according to yet another embodiment of the present disclosure.

FIG. 5 is a schematic flowchart of a wireless communication method according to yet another embodiment of the present disclosure.

DETAILED DESCRIPTION

Figure 6:
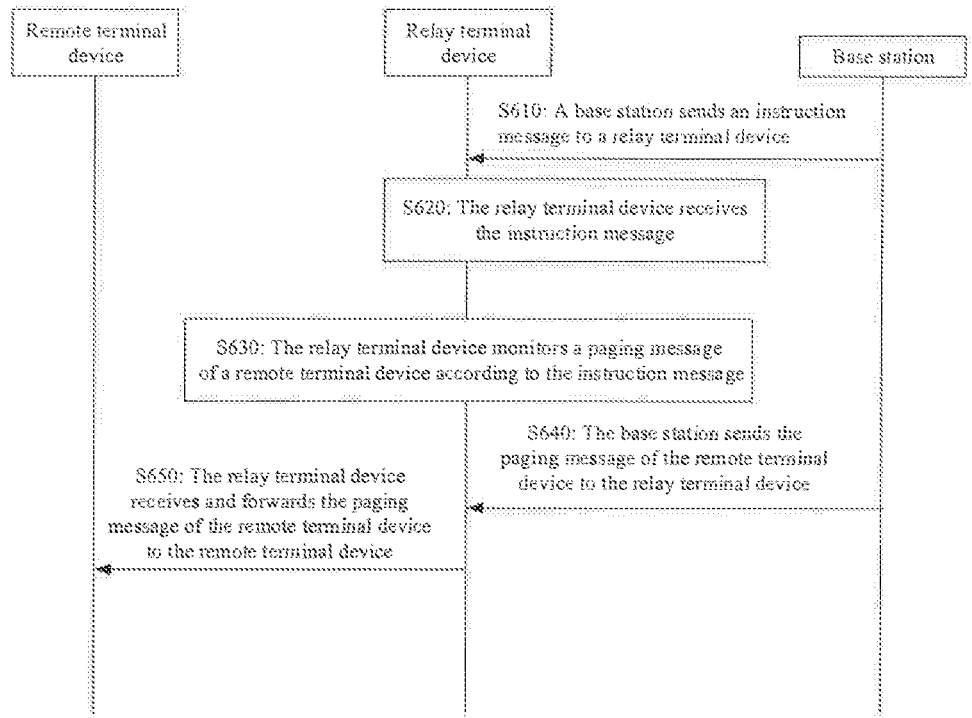
FIG. 6 illustrates a schematic flowchart of a wireless communication method according to an embodiment of the present disclosure.

The technical solutions in the embodiments of the disclosure will be described below in combination with the accompanying drawings.

FIG. 1 is a schematic diagram of a communication system using a data transmission method of the disclosure. As illustrated in FIG. 1, the communication system 100 includes a remote terminal device 110, a relay terminal device 120, an access network device 130, a Control Plane (CP) 140, a User Plane (UP) 150, and a data network 160.

In addition, those of ordinary skill in the art will appreciate that communications among different devices of the communication system 100 are implemented via interfaces.

The remote terminal device 110 may perform data transmission through the relay terminal device 120. For example, when receives downlink data for the remote terminal device 110, the access network device 130 may send a paging message to the remote terminal device 110 through the relay terminal device 120. In the embodiments of the disclosure, the remote terminal device 110 includes, but not limited to, a wearable device, a smart refrigerator, and a smart air conditioner. For example, the wearable device may include a smart bracelet, a smart helmet and the like.

The relay terminal device 120 may establish a user plane connection with the access network device 130 through a bearer, and may also establish a communication signaling connection with the CP 140 through an interface. It should be understood that the relay terminal device 120 may communicate with multiple remote terminal devices 110. In the embodiments of the present disclosure, the relay terminal device 120 may include, but not limited to, an access terminal, User Equipment (UE), a user unit, a subscriber station, a mobile radio station, a mobile station, a remote station, a remote terminal, a mobile terminal, a user terminal, a terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), handheld equipment with a wireless communication function, computing equipment or other processing equipment connected to a wireless modem, vehicle-mounted equipment, terminal equipment in the Internet of Things, a virtual reality device, terminal equipment in the future 5G network, or terminal equipment in the future evolved Public Land Mobile Network (PLMN) and the like.

The access network device 130 may be a device that communicates with the relay terminal device 120, such as a base station or a base station controller. However, it will be appreciated that the access network device 130 may communicate with any number of terminal devices similar to the relay terminal device 120. The access network device 130 may also communicate with the CP 140 via an interface.

Similarly, the access network device 130 may also communicate with the UP 150 via an interface. Each access network device may provide communication coverage for a specific geographic area and may communicate with terminal devices (for example, UE) located within the coverage area (cell). The access network device may support different schemes of communication protocols, or different communication modes. In at least one embodiment, the access network device 130 may provide a wireless access service for a terminal device. For example, the access network device 130 may be an Evolved Node B (eNodeB) or a Wireless Fidelity Access Point (WiFi AP), or a Worldwide Interoperability for Microwave Access Base Station (WiMAX BS), or a controller in a Cloud Radio Access Network (CRAN), or a network device in the future 5G network or a network device in the future evolved PLMN.

The CP 140 is responsible for the mobility management and forwarding path management in the communication system 100, such as issuing a packet forwarding policy to the UP 150, or instructing a Gateway User Plane (GW-U) to perform processing and forwarding of packet according to the packet forwarding policy. The CP 140 may be a Software Defined Network (SDN) controller, a Gateway Control Plane (GW-C), a Mobility Management Entity (MME), or all or part of the control functions formed after convergence of the above network elements. The SDN technology provides an effective way for the bottleneck problem of gateway signaling processing. By further separating in the gateway an interface signaling processing function of a control plane from a data forwarding function of a user plane, the interface signaling processing function is integrated on a universal computing platform to form a CP, and the user plane data forwarding function is integrated on a dedicated hardware platform to form a UP. The CP 140 may also be divided into a mobility management network element and a session management network element. The mobility management network element is responsible for mobility management of a terminal device, such as associating a terminal device being associated with a network, or a location change of the terminal device. The session management network element is responsible for session management of the terminal device, such as session establishment, modification, or release of the session. In addition, the decoupling implemented by control and forwarding through a gateway device greatly simplifies the design of a hardware platform, reduces the cost of the hardware platform, and facilitates acceleration of the deployment of mobile packet data networks. The MME is mainly responsible for mobility management and session management of a control plane, such as user authentication, handover, mobility management of terminals in idle state, user context management, and bearer management.

The UP 150 is responsible for processing and forwarding of packet. The UP 150 may be a physical or virtual forwarding device such as a forwarding plane function of a P-GW, a forwarding plane function of an S-GW, a router or a switch.

The data network 160 provides a data transmission service for a user and may be a Packet Data Network (PDN) such as the Internet, or an IP Multi-media Service (IP IMS).

The remote terminal device 110, the relay terminal device 120, or the access network device 130 may be a wireless communication sending apparatus and/or a wireless communication receiving apparatus. During sending of data, the wireless communication sending apparatus may encode the data for transmission. In particular, the wireless communication sending apparatus may acquire (e.g., generate, receive from other communication apparatuses, or store in a memory, etc.) a certain number of data bits to be sent over a channel to the wireless communication receiving apparatus. Such data bits may be included in a transport block (or multiple transport blocks) of data, which may be segmented to generate multiple code blocks.

In addition, the communication system 100 may be a PLMN, a Device to Device (D2D) network, a Machine to Machine (M2M) network or other networks. FIG. 1 is only a simplified schematic diagram, and the network may further include other network devices which are not illustrated in FIG. 1.

The wireless communication method provided by the embodiments of the present disclosure may be applied to a relay terminal device, and the relay terminal device includes a hardware layer, an operating system layer running on the hardware layer, and an application layer running on the operating system layer. The hardware layer includes hardware such as a Central Processing Unit (CPU), a Memory Management Unit (MMU), and a memory (also called a Main memory). The operating system may be any one or more computer operating systems that implement service processing through a process, such as a Linux operating system, a Unix operating system, an Android operating system, an iOS operating system, or a Windows operating system. The application layer includes applications such as browsers, address books, word processing software, or instant messaging software.

The wireless communication method provided by the embodiments of the present disclosure may be applied to a network device, and the network device may be an access network device or a core network. For example, the core network sends a paging message, or the access network device sends a paging message in response to requirements of the core network.

Furthermore, various aspects or features of the present disclosure may be implemented as a method, apparatus, or article of manufacture using standard programming and/or engineering technologies. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), an optical disk (such as a Compact Disk (CD) and a Digital Versatile Disk (DVD)), a smart card and a flash memory device (such as an Erasable Programmable Read-Only Memory (EPROM), a card, a stick or a key driver). Additionally, various storage media described herein may represent one or more devices and/or other machine-readable media for storing information. The term "machine-readable medium" may include, but not limited to, various media capable of storing, containing, and/or carrying instructions and/or data.

FIG. 2 is a schematic flowchart of a wireless communication method 200 according to an embodiment of the present disclosure. As illustrated in FIG. 2, a network device may be the access network device as illustrated in FIG. 1, or may be the data network as illustrated in FIG. 1, a first terminal device may be the relay terminal device as illustrated in FIG. 1, and a second terminal device may be the remote terminal device as illustrated in FIG. 1. The method 200 includes the following actions.

In 210, a network device sends an instruction message to a first terminal device, the instruction message being used for instructing the first terminal device to monitor a paging message of a second terminal device at a paging occasion of the first terminal device, or instructing the first terminal device to monitor the paging message of the second terminal device at a paging occasion of the second terminal device. The second terminal device communicates with the network device through the first terminal device.

In at least one embodiment, before the network device sends the instruction message, the network device determines that the paging message of the second terminal device is sent at the paging occasion of the first terminal device. At this time, the instruction message may be used for instructing the first terminal device to monitor the paging message of the second terminal device at the paging occasion of the first terminal device.

In at least one embodiment, before the network device sends the instruction message, the network device determines that the paging message of the second terminal device is sent at the paging occasion of the second terminal device. At this time, the instruction message may be used for instructing the first terminal device to monitor the paging message of the second terminal device at the paging occasion of the second terminal device.

In at least one embodiment, the paging message of the second terminal device may be carried in the paging message of the first terminal device. For example, in condition that the network device sends the paging message of the first terminal device, the paging message of the second terminal device may also be carried and sent in the paging message of the first terminal device.

In at least one embodiment, the instruction message is a system message or an RRC dedicated signaling.

Therefore, in the wireless communication method of the embodiments of the present disclosure, a network device instructs a first terminal device to monitor a paging message of a second terminal device at a paging occasion of the first terminal device by means of an instruction message, or instructs the first terminal device to monitor the paging message of the second terminal device at a paging occasion of the second terminal device. In this way, the network device may accurately send the paging message of the second terminal device through the first terminal device, and thus the correct transmission of downlink data of the second terminal device is ensured.

FIG. 3 is a schematic flowchart of a wireless communication method 300 according to an embodiment of the present disclosure. As illustrated in FIG. 3, a network device may be the access network device as illustrated in FIG. 1, or may be the data network as illustrated in FIG. 1, a first terminal device may be the relay terminal device as illustrated in FIG. 1, and a second terminal device may be the remote terminal device as illustrated in FIG. 1. The method 300 includes the following actions.

In 310, a network device receives a state update message from a first terminal device. The state update message is used for requesting the network device to update link state information of the link between the first terminal device and a second terminal device. The second terminal device communicates with the network device through the first terminal device.

In at least one embodiment, the first terminal device sends the state update message to the network device in condition that a link connection is established between the first terminal device and the second terminal device.

In at least one embodiment, after receiving the state update message, the network device determines whether to update link state information of the link between the first terminal device and the second terminal device.

In at least one embodiment, the network device sends a response message for the state update message to the first terminal device. In an example, the response message may indicate that update of the link state information of the link between the first terminal device and the second terminal device is successful, or that update of the link state information of the link between the first terminal device and the second terminal device fails, or that update of the link state information of the link between the first terminal device and the second terminal device is rejected.

For example, the response message indicating successful update of the link state information of the link between the first terminal device and the second terminal device may be an RRC Connection Reconfiguration message. The response message indicating update failure of the link state information of the link between the first terminal device and the second terminal device may be an RRC Connection Release message. In this case, a Failure Indication message is carried in the RRC Connection Release message. The response message indicating update rejection of the link state information of the link between the first terminal device and the second terminal device may be an RRC Connection Reject message.

In at least one embodiment, the network device sends according to the response message, a paging message of the second terminal device at a paging occasion of the first terminal device, or sends a paging message of the second terminal device at a paging occasion of the second terminal device.

For example, the network device sends a paging message of the second terminal device at a paging occasion of the second terminal device in condition that the response message includes the response message indicating update failure of the link state information of the link between the first terminal device and the second terminal device.

For another example, the network device sends a paging message of the second terminal device at a paging occasion of the second terminal device in condition that the response message includes the response message indicating update rejection of the link state information of the link between the first terminal device and the second terminal device.

For another example, the network device sends a paging message of the second terminal device at a paging occasion of the first terminal device in condition that the response message includes the responses message indicating successful update of the link state information of the link between the first terminal device and the second terminal device.

In the wireless communication method of the embodiments of the present disclosure, in condition that the response message sent by a network device includes a response message indicating that update of link state information fails or update of link state information is rejected, the network device sends a paging message of a second terminal device at a paging occasion of the second terminal device, and in condition that the response message sent by the network device includes the response message that update of the link state information is successful, the network device sends the paging message of the second terminal device at a paging occasion of a first terminal device, so that correct transmission of downlink data of the second terminal device is ensured.

FIG. 4 is a schematic flowchart of a wireless communication method 400 according to an embodiment of the disclosure. As illustrated in FIG. 4, a network device may be the access network device as illustrated in FIG. 1, or may be the data network as illustrated in FIG. 1, a first terminal device may be the relay terminal device as illustrated in FIG. 1, and a second terminal device may be the remote terminal device as illustrated in FIG. 1. The method 400 includes the following actions.

In 410, a first terminal device receives an instruction message from a network device. The instruction message is used for instructing the first terminal device to monitor a paging message of a second terminal device at a paging occasion of the second terminal device, or instructing the first terminal device to monitor a paging message of the second terminal device at a paging occasion of the first terminal device. The second terminal device communicates with the network device through the first terminal device.

In 420, the first terminal device monitors the paging message of the second terminal device according to the instruction message.

In at least one embodiment, the first terminal device sends the paging message of the second terminal device to the second terminal device after the paging message of the second terminal device is monitored.

It should be understood that after the paging message of the second terminal device is monitored, the first terminal device only forwards the paging message of the second terminal device to the second terminal device, and does not process the paging message of the second terminal device itself.

In at least one embodiment, the paging message of the second terminal device is carried in a paging message of the first terminal device.

In at least one embodiment, the instruction message is a system message or an RRC dedicated signaling.

In at least one embodiment, the instruction message is a system message or an RRC dedicated signaling.

In the wireless communication method of the embodiments of the present disclosure, a first terminal device monitors a paging message of a second terminal device according to an instruction message received from a network device, so that correct transmission of downlink data of the second terminal device is ensured.

FIG. 5 is a schematic flowchart of a wireless communication method 500 according to an embodiment of the present disclosure. As illustrated in FIG. 5, a network device may be the access network device as illustrated in FIG. 1, or may be the data network as illustrated in FIG. 1, a first terminal device may be the relay terminal device as illustrated in FIG. 1, and a second terminal device may be the remote terminal device as illustrated in FIG. 1. The method 500 includes the following actions.

In 510, a first terminal device sends a state update message to a network device, the state update message being used for updating link state information of a link between the first terminal device and a second terminal device. The second terminal device communicates with the network device through the first terminal device.

In at least one embodiment, the network device receives the state update message sent by the first terminal device, and determines whether to update link state information of the link between the first terminal device and the second terminal device according to the state update message. In an example, after update of the link state information of the link between the first terminal device and the second terminal device is completed or in condition that update of the link state information of the link between the first terminal device and the second terminal device is rejected, the network device sends a response message for the state update message to the first terminal device.

In at least one embodiment, the first terminal device receives the response message for the state update message sent by the network device.

In at least one embodiment, the response message for the state update message may indicate that update of the link state information of the link between the first terminal device and the second terminal device is successful, or that update of the link state information of the link between the first terminal device and the second terminal device fails, or that update of the link state information of the link between the first terminal device and the second terminal device is rejected.

For example, the response message indicating successful update of the link state information of the link between the first terminal device and the second terminal device may be an RRC Connection Reconfiguration message. The response message indicating update failure of the link state information of the link between the first terminal device and the second terminal device may be an RRC Connection Release message. In this case, a Failure Indication message is carried in the RRC Connection Release message. The response message indicating update rejection of the link state information of the link between the first terminal device and the second terminal device may be an RRC Connection Reject message.

In at least one embodiment, according to the response message, the first terminal device may monitor a paging message of the second terminal device at a paging occasion of the second terminal device or monitor a paging message of the second terminal device at a paging occasion of the first terminal device.

For example, the first terminal device monitors a paging message of the second terminal device at a paging occasion of the second terminal device in condition that the response message includes the response message indicating update failure of the link state information of the link between the first terminal device and the second terminal device.

For another example, the first terminal device monitors a paging message of the second terminal device at a paging occasion of the second terminal device in condition that the response message includes the response message indicating update rejection of the link state information of the link between the first terminal device and the second terminal device.

For another example, the first terminal device monitors a paging message of the second terminal device at a paging occasion of the first terminal device in condition that the response message includes the response message indicating successful update of the link state information of the link between the first terminal device and the second terminal device.

In the wireless communication method of the embodiments of the present disclosure, according to the response message for a link state update message, a first terminal device may determine that a paging message of a second terminal device is monitored at a paging occasion of the second terminal device or that the paging message of the second terminal device is monitored at a paging occasion of the first terminal device, so that the paging message of the second terminal device may be received correctly by the first terminal device, and thus correct transmission of downlink data of the second terminal device is ensured.

In at least one embodiment, as an embodiment, as illustrated in FIG. 6, the method 600 includes the following actions.

In S610, a base station sends an instruction message to a relay terminal device.

In at least one embodiment, the instruction message is used for instructing the relay terminal device to monitor a paging message of a remote terminal device at a paging occasion of the relay terminal device, or instructing the relay terminal device to monitor a paging message of the remote terminal device at a paging occasion of the remote terminal device.

It should be understood that the remote terminal device communicates with the network device through the relay terminal device.

In at least one embodiment, the instruction message is a system message or an RRC dedicated signaling.

In S620, the relay terminal device receives the instruction message.

In S630, the relay terminal device monitors a paging message of a remote terminal device according to the instruction message.

In S640, the base station sends the paging message of the remote terminal device to the relay terminal device.

In at least one embodiment, the base station sends the paging message of the remote terminal device at a paging occasion of the remote terminal device. At this time, the instruction message may be used for instructing the relay terminal device to monitor the paging message of the remote terminal device at the paging occasion of the remote terminal device.

In at least one embodiment, the base station sends the paging message of the remote terminal device at a paging occasion of the relay terminal device. At this time, the instruction message may be used for instructing the relay terminal device to monitor the paging message of the remote terminal device at the paging occasion of the relay terminal device.

In at least one embodiment, the paging message of the remote terminal device may be carried in a paging message of the relay terminal device. For example, when the base station sends the paging message of the relay terminal device, the paging message of the remote terminal device may also be carried and sent in the paging message of the relay terminal device.

In S650, the relay terminal device receives the paging message of the remote terminal device, and forwards the received paging message of the remote terminal device to the remote terminal device.

In the wireless communication method of the embodiments of the present disclosure, a base station instructs a relay terminal device to monitor a paging message of a remote terminal device at a paging occasion of the relay terminal device by means of an instruction message, or instructs the relay terminal device to monitor the paging message of the remote terminal device at a paging occasion of the remote terminal device, so that the paging message of the remote terminal device may be transmitted correctly by the base station through the relay terminal device, and thus correct transmission of downlink data of the remote terminal device is ensured.

Figure 7:
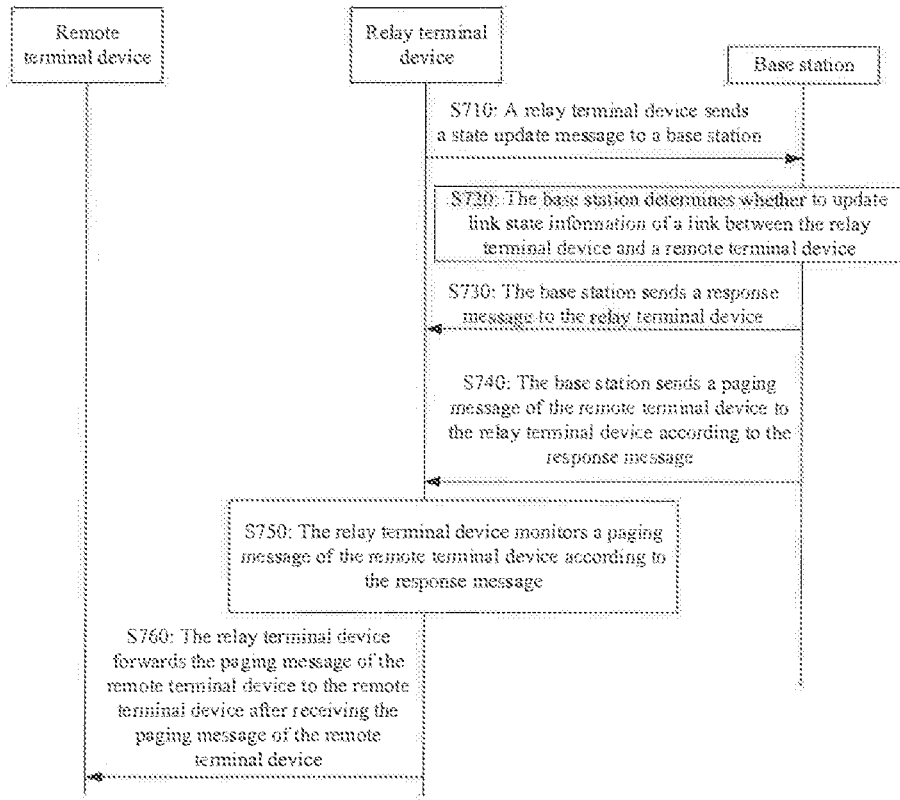
FIG. 7 illustrates another schematic flowchart of a wireless communication method according to an embodiment of the present disclosure.

In at least one embodiment, as an embodiment, illustrated in FIG. 7, the method 700 includes the following actions.

In S710, a relay terminal device sends a state update message to a base station.

In at least one embodiment, the state update message is used for requesting the base station to update link state information of a link between the relay terminal device and a remote terminal device.

In at least one embodiment, the relay terminal device sends the state update message to the base station device in condition that the relay terminal device establishes a link connection with the remote terminal device.

In S720, the base station determines whether to update link state information of the link between the relay terminal device and a remote terminal device.

In at least one embodiment, update of the link state information of the link between the relay terminal device and the remote terminal device may be rejected by the base station.

In at least one embodiment, update of the link state information of the link between the relay terminal device and the remote terminal device by the base station may be successful or may fail.

In S730, the base station sends a response message to the relay terminal device.

It should be understood that the response message is a response message for the state update message.

In at least one embodiment, the response message may indicates that update of the link state information of the link between the relay terminal device and the remote terminal device is successful, or that update of the link state information of the link between the relay terminal device and the remote terminal device fails, or that update of the link state information of the link between the relay terminal device and the remote terminal device is rejected.

For example, the response message indicating successful update of the link state information of the link between the relay terminal device and the remote terminal device may be an RRC Connection Reconfiguration message. The response message indicating update failure of the link state information of the link between the relay terminal device and the remote terminal device may be an RRC Connection Release message. In this case, a Failure Indication message is carried in the RRC Connection Release message. The response message indicating update rejection of the link state information of the link between the relay terminal device and the remote terminal device may be an RRC Connection Reject message.

In S740, the base station sends a paging message of the remote terminal device to the relay terminal device according to the received response message.

For example, the base station sends a paging message of the remote terminal device at a paging occasion of the remote terminal device in condition that the response message includes the response message indicating update failure of the link state information of the link between the relay terminal device and the remote terminal device.

For another example, the base station sends a paging message of the remote terminal device at a paging occasion of the remote terminal device in condition that the response message includes the response message indicating update rejection of the link state information of the link between the relay terminal device and the remote terminal device.

For another example, the base station sends a paging message of the remote terminal device at a paging occasion of the relay terminal device in condition that the response message includes a response message indicating successful update of the link state information of the link between the relay terminal device and the remote terminal device.

In S750, the relay terminal device monitors a paging message of the remote terminal device according to the received response message.

For example, the relay terminal device monitors a paging message of the remote terminal device at a paging occasion of the remote terminal device in condition that the response message includes the response message indicating update failure of the link state information of the link between the relay terminal device and the remote terminal device.

For another example, the relay terminal device monitors a paging message of the remote terminal device at a paging occasion of the remote terminal device in condition that the response message includes the response message indicating update rejection of the link state information of the link between the relay terminal device and the remote terminal device.

For another example, the relay terminal device monitors a paging message of the remote terminal device at a paging occasion of the remote terminal device in condition that the response message includes the response message indicating successful update of the link state information of the link between the relay terminal device and the remote terminal device.

In S760, the relay terminal device forwards the paging message of the remote terminal device to the remote terminal device after receiving the paging message of the remote terminal device.

In the wireless communication method of the embodiments of the present disclosure, according to a response message for a link state update message, a relay terminal device may determine that a paging message of a remote terminal device is monitored at a paging occasion of the remote terminal device, or the paging message of the remote terminal device is monitored at a paging occasion of the relay terminal device, so that the paging message of the remote terminal device may be received correctly by the relay terminal device, and thus correct transmission of downlink data of the remote terminal device is ensured.

Figure 8:
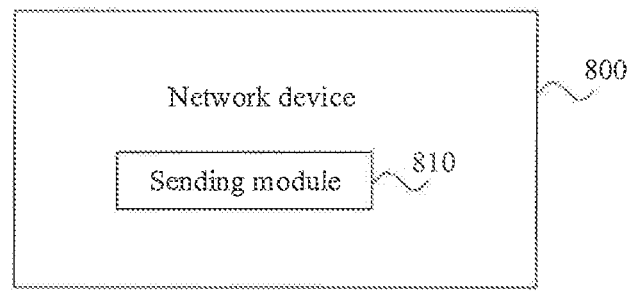
FIG. 8 illustrates a schematic block diagram of a network device according to an embodiment of the present disclosure.

FIG. 8 is a schematic block diagram of a network device 800 according to an embodiment of the present disclosure. As illustrated in FIG. 8, the device 800 includes: a sending module 810.

The sending module 810 is configured to send an instruction message to a first terminal device, the instruction message being used for instructing the first terminal device to monitor a paging message of a second terminal device at a paging occasion of the first terminal device or instructing the first terminal device to monitor a paging message of the second terminal device at a paging occasion of the second terminal device. The second terminal device communicates with the network device through the first terminal device.

In at least one embodiment, the network device 800 further includes a determination module 820.

The determination module 820 is configured to determine that a paging message of the second terminal device is sent at a paging occasion of the first terminal device before the sending module 810 sends the instruction message to the first terminal device.

The sending module 810 is further configured to send to the first terminal device the instruction message for instructing the first terminal device to monitor the paging message of the second terminal device at the paging occasion of the first terminal device.

In at least one embodiment, the determination module 820 is further configured to determine that a paging message of the second terminal device is sent at a paging occasion of the second terminal device before the sending module 810 sends the instruction message to the first terminal device.

The sending module 810 is further configured to send to the first terminal device the instruction message for instructing the first terminal device to monitor the paging message of the second terminal device at the paging occasion of the second terminal device.

In at least one embodiment, the paging message of the second terminal device is carried in a paging message of the first terminal device.

In at least one embodiment, the instruction message is a system message or an RRC dedicated signaling.

It should be understood that the above-mentioned and other operations and/or functions of each module in the network device 800 according to the embodiments of the disclosure are adopted to implement the corresponding flows executed by the terminal device in the method 200 in FIG. 2 and the base station in the method 600 in FIG. 6 respectively, and will not be elaborated herein for simplicity.

Figure 9:
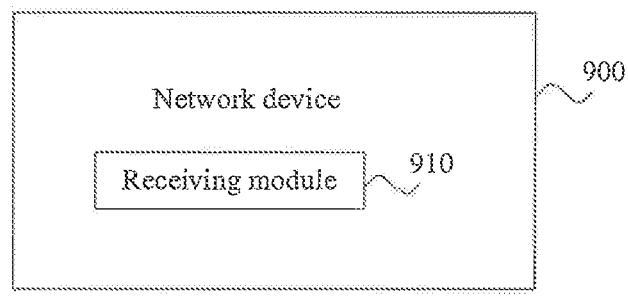
FIG. 9 illustrates another schematic block diagram of a network device according to an embodiment of the present disclosure.

FIG. 9 is a schematic block diagram of a network device 900 according to an embodiment of the present disclosure. As illustrated in FIG. 9, the device 900 includes a receiving module 910.

The receiving module 910 is configured to receive a state update message from a first terminal device, the state update message being used for requesting the network device to update link state information of a link between the first terminal device and a second terminal device. The second terminal device communicates with the network device through the first terminal device.

In at least one embodiment, the network device 900 further includes a sending module 920.

The sending module 920 is configured to send a response message for the state update message to the first terminal device.

The network device 920 is further configured to send according to the response message, a paging message of the second terminal device at a paging occasion of the first terminal device, or send a paging message of the second terminal device at a paging occasion of the second terminal device.

In at least one embodiment, the network device 920 is further configured to send a response message indicating successful update of the link state information of the link between the first terminal device and the second terminal device.

The network device 920 is further configured to send a response message indicating update failure of the link state information of the link between the first terminal device and the second terminal device.

The network device 920 is further configured to send a response message indicating update rejection of the link state information of the link between the first terminal device and the second terminal device.

In at least one embodiment, the network device 920 is further configured to send a paging message of the second terminal device at a paging occasion of the second terminal device in condition that the response message includes the response message indicating update failure of the link state information of the link between the first terminal device and the second terminal device.

The network device 920 is further configured to send a paging message of the second terminal device at a paging occasion of the second terminal device in condition that the response message includes the response message indicating update rejection of the link state information of the link between the first terminal device and the second terminal device.

The network device 920 is further configured to send a paging message of the second terminal device at a paging occasion of the first terminal device in condition that the response message includes the response message indicating successful update of the link state information of the link between the first terminal device and the second terminal device.

In at least one embodiment, the response message indicating update failure of the link state information of the link between the first terminal device and the second terminal device may be an RRC connection release message, the RRC connection release message including a connection failure indication message. The response message indicating update rejection of the link state information of the link between the first terminal device and the second terminal device may be an RRC connection rejection message. The response message indicating successful update of the link state information of the link between the first terminal device and the second terminal device may be an RRC connection configuration message.

It should be understood that the above-mentioned and other operations and/or functions of each module in the terminal device 900 according to the embodiments of the present disclosure are adopted to implement the corresponding flows executed by the terminal device in the method 300 in FIG. 3 and the base station in the method 700 in FIG. 7 respectively, and will not be elaborated herein for simplicity.

Figure 10:
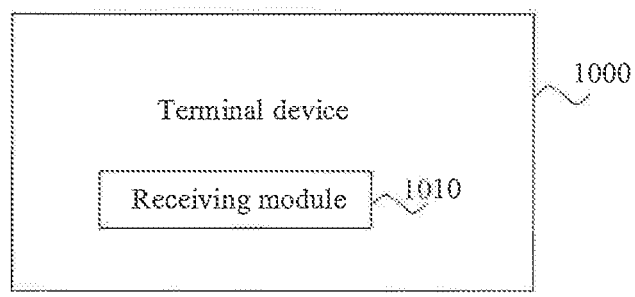
FIG. 10 illustrates a schematic block diagram of a terminal device according to an embodiment of the present disclosure.

FIG. 10 is a schematic block diagram of a network device 1000 according to an embodiment of the present disclosure. As illustrated in FIG. 10, a terminal 1000 includes a receiving module 1010.

The receiving module 1010 is configured to receive an instruction message from a network device, the instruction message being used for instructing the first terminal device to monitor a paging message of a second terminal device at a paging occasion of the second terminal device, or instructing the first terminal device to monitor a paging message of the second terminal device at a paging occasion of the first terminal device. The second terminal device communicates with the network device through the first terminal device.

The receiving module 1010 is further configured to monitor the paging message of the second terminal device according to the instruction message.

In at least one embodiment, the terminal device 1000 further includes a sending module 1010.

The sending module 1010 is configured to send the paging message of the second terminal device to the second terminal device after the receiving module monitors the paging message of the second terminal device.

In at least one embodiment, the paging message of the second terminal device is carried in a paging message of the first terminal device.

In at least one embodiment, the instruction message is a system message or an RRC dedicated signaling.

It should be understood that the above-mentioned and other operations and/or functions of each module in the terminal device 1000 according to the embodiments of the present disclosure are adopted to implement the corresponding flows executed by the first terminal device in the method 400 in FIG. 4 and the relay terminal device in the method 600 in FIG. 6 respectively and will not be elaborated herein for simplicity.

Figure 11:
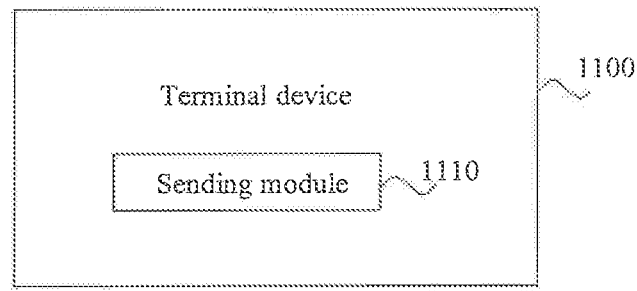
FIG. 11 illustrates another schematic block diagram of a terminal device according to an embodiment of the present disclosure.

FIG. 11 is a schematic block diagram of a network device 1100 according to an embodiment of the present disclosure. As illustrated in FIG. 11, a terminal 1100 includes a sending module 1110.

The sending module 1110 is configured to send a state update message to a network device, the state update message being used for updating link state information of a link between the first terminal device and a second terminal device. The second terminal device communicates with the network device through the first terminal device.

In at least one embodiment, the terminal device 1100 further includes a receiving module 1120.

The receiving module 1120 is configured to receive a response message for the state update message from the network device.

The receiving module 1120 is further configured to monitor a paging message of the second terminal device at a paging occasion of the second terminal device or monitor a paging message of the second terminal device at a paging occasion of the first terminal device according to the response message.

In at least one embodiment, the receiving module 1120 is further configured to monitor a paging message of the second terminal device at a paging occasion of the second terminal device in condition that the response message includes an RRC connection release message and the RRC connection release message includes a connection failure indication message.

The receiving module 1120 is further configured to monitor a paging message of the second terminal device at a paging occasion of the second terminal device in condition that the response message includes an RRC connection rejection message.

The receiving module 1120 is further configured to monitor a paging message of the second terminal device at a paging occasion of the first terminal device in condition that the response message includes an RRC connection configuration message.

In at least one embodiment, the terminal device 1100 further includes a determination module 1130.

The determination module 1130 is configured to: in condition that the response message includes the RRC connection release message or the RRC connection rejection message, determine that the state update message is not required to be resent to the network device in condition that the link between the first terminal device and the second terminal device is disconnected.

In at least one embodiment, the sending module 1110 is configured to send the paging message of the second terminal device to the second terminal device after the paging message of the second terminal device is monitored.

It should be understood that the above-mentioned and other operations and/or functions of each module in the terminal device 1100 according to the embodiments of the present disclosure are adopted to implement the corresponding flows executed by the terminal device in the method 500 in FIG. 5 and the base station in the method 700 in FIG. 7 respectively and will not be elaborated herein for simplicity.

Figure 12:
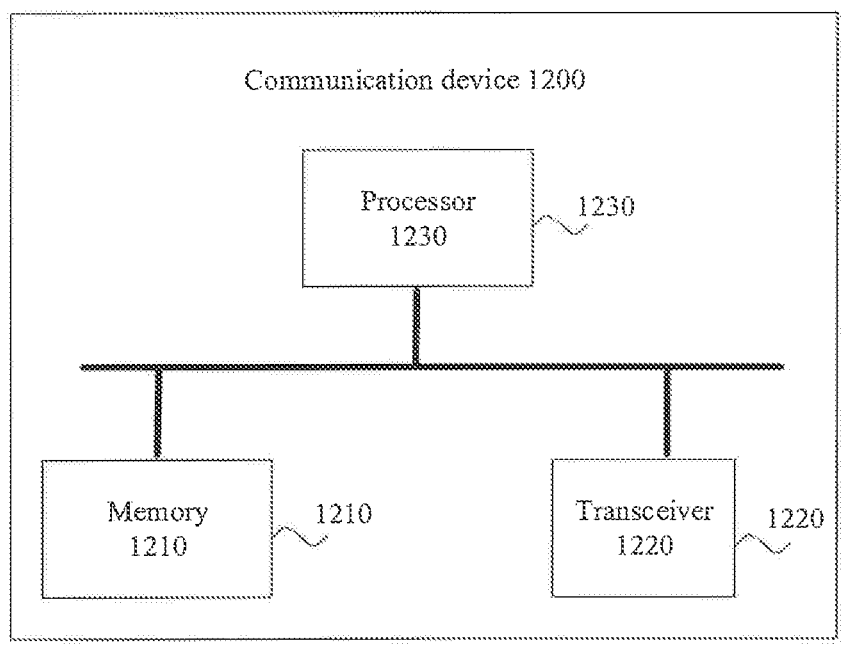
FIG. 12 illustrates a schematic block diagram of a communication device according to an embodiment of the present disclosure.

FIG. 12 is a schematic block diagram of a communication device 1200 according to an embodiment of the present disclosure. The communication device 1200 includes a memory 1210, a transceiver 1220 and a processor 1230.

The memory 1210 is configured to store a program including codes.

The transceiver 1220 is configured to communicate with other devices.

The processor 1230 is configured to execute the codes of the program in the memory 1210.

In at least one embodiment, when the code is executed, the processor 1230 may implement various operations executed by the network device in the method 200 in FIG. 2 and the method 300 in FIG. 3, and the base station in the method 600 in FIG. 6 and the method 700 in FIG. 7, which will not be elaborated herein for simplicity. At this time, the communication device 1200 may be an access network device or a core network device. The transceiver 1220 is configured to perform specific signal transmission and reception under the driving of the processor 1230.

In at least one embodiment, when the code is executed, the processor 1230 may further implement various operations executed by the first terminal device in the method 400 in FIG. 4 and the method 500 in FIG. 5, and the relay terminal device in the method 600 in FIG. 6 and the method 700 in FIG. 7, which will not be elaborated herein for simplicity. At this time, the communication device 1200 may be a relay terminal device, such as a mobile phone.

It should be understood that in the embodiment of the present disclosure, the processor 1230 may be a CPU. The processor 1230 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the universal processor may also be any conventional processor, etc.

The memory 1210 may include a Read-Only Memory (ROM) and a Random Access Memory (RAM) and provides instructions and data to the processor 1230. A portion of the memory 1210 may also include a non-volatile RAM. For example, the memory 1210 may also store information of a device type.

The transceiver 1220 may be configured to realize signal transmission and reception functions, for example, frequency modulation and demodulation functions or up-conversion and down-conversion functions.

In an implementation process, at least one operation of the above method may be completed through an integrated logical circuit of hardware in the processor 1230, or the at least one operation may be completed by the integrated logical circuit under driving of an instruction in a software form. Therefore, the wireless communication device 1200 may be a chip or a set of chips. The operations of the method disclosed in combination with the embodiments of the present disclosure may be directly embodied to be executed and completed by a hardware processor or executed and completed by a combination of hardware and software modules in the processor. The software module may be located in a mature storage medium such as a RAM, a flash memory, a ROM, a programmable ROM or an electrically erasable programmable memory, and a register. The storage medium is located in the memory, and the processor 1230 reads information in the memory, and completes the operations of the methods in combination with hardware. Detailed descriptions thereof will not be elaborated to avoid repetition.

All or part of the embodiments may be implemented by software, hardware, firmware or any combination thereof. In case of implementation with the software, all or part of the embodiments may be implemented in form of a computer program product. The computer program product includes one or more computer instructions. When the computer instructions are loaded and executed on a computer, the flows or functions according to the embodiments of the disclosure are all or partially formed. The computer may be a universal computer, a dedicated computer, a computer network or other programmable devices. The computer instructions may be stored in a computer-readable storage medium or be transmitted from one computer-readable storage medium to another computer-readable storage medium. For example, the computer instructions may be transmitted from one website, computer, server or data center to another website, computer, server or data center in a wired (for example, coaxial cable, optical fiber and Digital Subscriber Line (DSL) or wireless (for example, infrared, wireless and microwave) manner. The computer-readable storage medium may be any available medium accessible for the computer or data storage equipment including one or more integrated available medium such as a server and a data center. The available medium may be a magnetic medium (for example, a floppy disk, a hard disk and a magnetic tape), an optical medium (for example, a Digital Versatile Disc (DVD), a semiconductor medium (for example, a Solid State Disk (SSD)) or the like.

It should be understood that, in various embodiments of the disclosure, a magnitude of a sequence number of each process does not mean an execution sequence, and the execution sequence of each process should be determined by its function and an internal logic and should not form any limit to an implementation process of the embodiments of the disclosure.

Those skilled in the art may clearly learn about that specific working process of the system, device and unit described above may refer to the corresponding processes in the method embodiment and will not be elaborated herein for convenient and brief description.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A wireless communication method, comprising:
sending, by a network device, an instruction message to a first terminal device, wherein the instruction message is used for instructing the first terminal device to monitor a paging message of a second terminal device at a paging occasion of the first terminal device, or instructing the first terminal device to monitor a paging message of the second terminal device at a paging occasion of the second terminal device, the second terminal device communicating with the network device through the first terminal device;
receiving, by the network device, a state update message from the first terminal device, wherein the state update message is used for requesting the network device to update link state information of a link between the first terminal device and the second terminal device;
sending, by the network device, a response message for the state update message to the first terminal device; and
sending, by the network device according to the response message, a paging message of the second terminal device at a paging occasion of the first terminal device, or sending the paging message of the second terminal device at a paging occasion of the second terminal device.

2. The method according to claim 1, wherein before sending, by the network device, the instruction message to the first terminal device, the method further comprises:
determining, by the network device, that the paging message of the second terminal device is sent at the paging occasion of the first terminal device;
wherein sending, by the network device, the instruction message to the first terminal device comprises:
sending, by the network device to the first terminal device, the instruction message for instructing the first terminal device to monitor the paging message of the second terminal device at the paging occasion of the first terminal device;
or,
wherein before sending, by the network device, the instruction message to the first terminal device, the method further comprises:
determining, by the network device, that the paging message of the second terminal device is sent at the paging occasion of the second terminal device;
wherein sending, by the network device, the instruction message to the first terminal device comprises:
sending, by the network device to the first terminal device, the instruction message for instructing the first terminal device to monitor the paging message of the second terminal device at the paging occasion of the second terminal device.

3. The method according to claim 1, wherein the paging message of the second terminal device is carried in the paging message of the first terminal device and the instruction message is a system message or a Radio Resource Control (RRC) dedicated signaling.

4. The method according to claim 1, wherein sending, by the network device, the response message for the state update message to the first terminal device comprises:
sending, by the network device to the first terminal device, a response message indicating successful update of the link state information of the link between the first terminal device and the second terminal device; or sending, by the network device to the first terminal device, a response message indicating update failure of the link state information of the link between the first terminal device and the second terminal device; or sending, by the network device to the first terminal device, a response message indicating update rejection of the link state information of the (ink between the first terminal device and the second terminal device.

5. The method according to claim 4, wherein sending, by the network device according to the response message, the paging message of the second terminal device at the paging occasion of the first terminal device, or sending the paging message of the second terminal device at the paging occasion of the second terminal device comprises:

sending, by the network device, the paging message of the second terminal device at the paging occasion of the second terminal device in condition that the response message for the state update message comprises the response message indicating update failure of the link state information of the link between the first terminal device and the second terminal device; or sending, by the network device, the paging message of the second terminal device at the paging occasion of the second terminal device in condition that the response message for the state update message comprises the response message indicating update rejection of the link state information of the link between the first terminal device and the second terminal device; or sending, by the network device, the paging message of the second terminal device at the paging occasion of the first terminal device in condition that the response message for the state update message comprises the response message indicating successful update of the link state information of the link between the first terminal device and the second terminal device.

6. A wireless communication method, comprising:

receiving, by a first terminal device, an instruction message from a network device, wherein the instruction message is used for instructing the first terminal device to monitor a paging message of a second terminal device at a paging occasion of the second terminal device, or instructing the first terminal device to monitor a paging message of the second terminal device at a paging occasion of the first terminal device, the second terminal device communicating with the network device through the first terminal device; and monitoring, by the first terminal device, the paging message of the second terminal device according to the instruction message;

sending, by the first terminal device, a state update message to the network device, wherein the state update message is used for updating link state information of a link between the first terminal device and a second terminal device;

receiving, by the first terminal device, a response message for a state update message from the network device; and monitoring, by the first terminal device according to the response message, a paging message of the second terminal device at a paging occasion of the second terminal device, or monitoring a paging message of the second terminal device at a paging occasion of the first terminal device.

7. The method according to claim 6, further comprising:

sending, by the first terminal device, the paging message of the second terminal device to the second terminal device after the paging message of the second terminal device is monitored.

8. The method according to claim 6, wherein the paging message of the second terminal device is carried in a paging message of the first terminal device and the instruction message is a system message or a Radio Resource Control (RRC) dedicated signaling.

9. The method according to claim 6, wherein monitoring, by the first terminal device according to the response message, the paging message of the second terminal device at the paging occasion of the second terminal device, or monitoring the paging message of the second terminal device at the paging occasion of the first terminal device comprises:

monitoring, by the first terminal device, the paging message of the second terminal device at the paging occasion of the second terminal device in condition that the response message comprises a Radio Resource Control (RRC) connection release message and the RRC connection release message comprises a connection failure indication message; or monitoring, by the first terminal device, the paging message of the second terminal device at the paging occasion of the second terminal device in condition that the response message comprises an RRC connection rejection message; or monitoring, by the first terminal device, the paging message of the second terminal device at the paging occasion of the first terminal device in condition that the response message comprises an RRC connection reconfiguration message.

10. A terminal device, comprising: a processor, a memory for storing instructions executable by the processor, and a transceiver, wherein the processor is configured to execute the instructions to control the transceiver to:

receive an instruction message from a network device, wherein the instruction message is used for instructing a first terminal device to monitor a paging message of a second terminal device at a paging occasion of the second terminal device, or instructing the first terminal device to monitor a paging message of the second terminal device at a paging occasion of the first terminal device, the second terminal device communicating with the network device through the first terminal device;

monitor the paging message of the second terminal device according to the instruction message;

wherein the processor is further configured to execute the instruction to control the transceiver to:

send a state update message to the network device, wherein the state update message is used for updating link state information a link of between the first terminal device and the second terminal device;

receive a response message for the state update message from the network device; and monitor according to the response message, a paging message of the second terminal device at a paging occasion of the second terminal device or monitor a paging message of the second terminal device at a paging occasion of the first terminal device.

11. The terminal device according to claim 10, wherein the processor is further configured to execute the instructions to control the transceiver to:

send the paging message of the second terminal device to the second terminal device after the paging message of the second terminal device is monitored by the transceiver.

12. The terminal device according to claim 10, wherein the paging message of the second terminal device is carried in a paging message of the first terminal device and the instruction message is a system message or a Radio Resource Control (RRC) dedicated signaling.

13. The terminal device according to claim 10, wherein the processor is further configured to execute the instructions to control the transceiver to:

monitor the paging message of the second terminal device at the paging occasion of the second terminal device in condition that the response message comprises a Radio Resource Control (RRC) connection release message and the RRC connection release message comprises a connection failure indication message; or monitor the paging message of the second terminal device at the paging occasion of the second terminal device in condition that the response message comprises an RRC connection rejection message; or monitor the paging message of the second terminal device at the paging occasion of the first terminal device in condition that the response message comprises an RRC connection reconfiguration message.

14. The terminal device according to claim 13, wherein the processor is further configured to: in condition that the response message comprises the RRC connection release message or the RRC connection rejection message, determine that the state update message is not required to be resent to the network device in condition that the link between the first terminal device and the second terminal device is disconnected.

* * * * *